(12) United States Patent
Medeiros et al.

(10) Patent No.: US 9,805,202 B2
(45) Date of Patent: Oct. 31, 2017

(54) AUTOMATED SDK INGESTION

(71) Applicant: Evident.io, Inc., Dublin, CA (US)

(72) Inventors: Claire Medeiros, Dublin, CA (US); Justin Lundy, Dublin, CA (US)

(73) Assignee: EVIDENT.IO, INC., Dublin, CA (US)

( * ) Notice: Subject to any disclaimer, the term of this patent is extended or adjusted under 35 U.S.C. 154(b) by 0 days.

(21) Appl. No.: 14/540,576

(22) Filed: Nov. 13, 2014

(65) Prior Publication Data
US 2015/0135287 A1    May 14, 2015

Related U.S. Application Data

(60) Provisional application No. 61/903,864, filed on Nov. 13, 2013.

(51) Int. Cl.
*G06F 21/50* (2013.01)
*G06F 21/57* (2013.01)

(52) U.S. Cl.
CPC ............ *G06F 21/577* (2013.01); *G06F 21/50* (2013.01)

(58) Field of Classification Search
CPC ............................... G06F 21/577; G06F 21/50
USPC ............................................. 726/2, 3, 4, 5, 6
See application file for complete search history.

(56) References Cited

U.S. PATENT DOCUMENTS

| | | | |
|---|---|---|---|
| 6,055,637 A | 4/2000 | Hudson et al. | |
| 2008/0276102 A1 | 11/2008 | Mackay et al. | |
| 2011/0093937 A1* | 4/2011 | Mantle | G06F 21/6218 726/6 |
| 2012/0185913 A1 | 7/2012 | Martinez et al. | |
| 2014/0337268 A1* | 11/2014 | Bhattacharya | G06F 21/00 706/46 |
| 2015/0135313 A1* | 5/2015 | Wesie | G06F 9/445 726/22 |

OTHER PUBLICATIONS

International Search Report and Written Opinion dated Feb. 24, 2015 in International Patent Application No. PCT/US2014/065544, filed Nov. 13, 2014. 13 pages.
Extended European Search Report dated Apr. 13, 2017, European Patent Application No. 14862005.7, filed Nov. 13, 2014, 6 pages.

* cited by examiner

*Primary Examiner* — Jeffrey Pwu
*Assistant Examiner* — Nega Woldemariam
(74) *Attorney, Agent, or Firm* — Davis Wright Tremaine LLP; Philip H. Albert

(57) ABSTRACT

In an assessment or audit of a computer system, an auditing subsystem will parse software development kit ("SDK") interfaces and obtain customer usage, configuration and security information by applying requests for information to the application programming interfaces provided by the SDK interfaces.

23 Claims, 7 Drawing Sheets

SECURITY REPORT

| Region 302 | | Service 304 | | Severity 306 | | Status 308 | | TEAMS 310 |
|---|---|---|---|---|---|---|---|---|
| ☐ NE-1 | | ☑ EC2 | | ☑ High | | ☐ Pass | | Tim's Team |
| ☐ SE-1 | | ☑ ELB | | ☑ Medium | | ☑ Fail | | |
| ☐ SE-2 | | ☑ VPC | | ☑ Low | | ☑ Warn | | |
| ☐ EUW-1 | | ☑ IAM | | | | ☑ Error | | |
| ☐ SAE-1 | | ☑ GLO | | | | | | Signature Name 312 |
| ☑ USE-1 | | ☑ R53 | | | | | | |
| ☐ USW-1 | | ☑ SSS | | | | | | Signature Description 314 |
| ☐ USW-2 | | ☑ GLA | | | | | | |
| | | ☑ CLT | | | | | | |
| | | ☑ RDS | | | | | | |

| Team 320 | Name 322 | Signature 324 | Signature Identifier 316 | Region 326 | Service | Related Information 318 | Risk Level 328 | Status 330 332 |
|---|---|---|---|---|---|---|---|---|
| Tim's Team | IAM Admin SPOF Avoidance | AWS:IAM-009 | | us_east_1 | IAM | | High | fail |
| Tim's Team | Non-Default VPC NACL | AWS:VPC-009 | | us_east_1 | VPC | | High | fail |
| Tim's Team | Deployed VPC | AWS:VPC-001 | | us_east_1 | VPC | | High | fail |
| Tim's Team | Root MFA | AWS:IAM-003 | | us_east_1 | IAM | | High | fail |
| Tim's Team | Global DNS UDP | AWS:EC2-023 | | us_east_1 | EC2 | | High | fail |
| Tim's Team | Global DNS UDP | AWS:EC2-023 | | us_east_1 | EC2 | | High | fail |
| Tim's Team | Global DNS UDP | AWS:EC2-023 | | us_east_1 | EC2 | | High | fail |
| Tim's Team | EBS Volume Encryption | AWS:EC20-32 | | us_east_1 | EC2 | | Medium | fail |

FIG. 3

AUTOMATED SDK INGESTION

CROSS-REFERENCES TO PRIORITY AND RELATED APPLICATIONS

This application claims priority from and is a non-provisional of U.S. Provisional Patent Application No. 61/903,864 filed Nov. 13, 2013 entitled "AUTOMATED SDK INGESTION." The entire disclosure of the application recited above is hereby incorporated by reference herein in its entirety, as if set forth in full in this document, for all purposes.

FIELD OF THE INVENTION

The present disclosure relates generally to automatically processing system development kit interfaces as part of a security assessment of a computer system.

BACKGROUND

Companies, individuals, and customers often utilize networks of computing devices to provide one or more Web-based services to their users, and those networks often extend beyond multiple geographic boundaries. In many situations, customers may configure and operate remote networks using hardware and software applications managed by other companies in order to reduce infrastructure costs and use web services to leverage the customer's products, utilities, and for other advantages.

As web services and remote computing applications have flourished in recent years, resource providers are enabling customers to the ability to access a variety of applications and web services with a myriad of security options and configurations to be serviced. Security is important in computer systems, but often the extent and configuration of the computer system is not entirely known in advance and is frequently changing and being upgraded. As some or all portions of customer computer systems involve the use of cloud-based resources, the process of security and usage testing of a computer system is becoming complicated. While software security patches attempt to resolve known vulnerabilities and other risks,

BRIEF DESCRIPTION OF THE DRAWINGS

Various embodiments in accordance with the present disclosure will be described with reference to the drawings, in which:

FIG. 3 is an illustrative example of a block diagram in accordance with at least one embodiment;

Appendix A is an example extract of programming code scrape results in accordance with the disclosure, the contents of which is protected under U.S. Copyright Laws; and Appendix B is an example extract of programming code for post-processing scraped results in accordance with the disclosure, the contents of which is protected under U.S. Copyright Laws.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods, systems, and computer-readable mediums configured to traverse customer applications in order to scrape data to determine possible configuration errors or anomalies within a web services' control systems. A security platform and components according to the present disclosure are configured to leverage web service software development kits ("SDKs") in order to extract information and data from the web service's application programming interface ("API") related to all web services. Web services, for example, may include computing services, networking services, content delivery services, database services, deployment services, management services, applications services, and the like.

An example embodiment according to the present disclosure includes a scanning client that is configured to traverse or "walk" SDK interfaces, to obtain customer usage, configuration and security information by applying requests for information to the APIs provided by the SDK interfaces. A customer may be provided with a user interface ("UI"), such as a dashboard, which allows the customer or an operator of the customer to perform risk analysis of customer cloud infrastructures, globally. Examples of cloud infrastructures include such structures as Amazon.com's cloud infrastructure, Amazon Web Services® ("AWS"), Google® App Engine, DigitalOcean®, or other computing resource service providers' infrastructure, such as Software-as-a-Service providers, Platform-as-a-Service providers, Infrastructure-as-a-Service providers, and the like. In many example embodiments presented herein, AWS® services are referenced as example types of available cloud infrastructure web services; however, alternative computing resource service providers or cloud-providers serving a similar purpose could be used as would be apparent to one of ordinary skill in the art.

Figure 1:
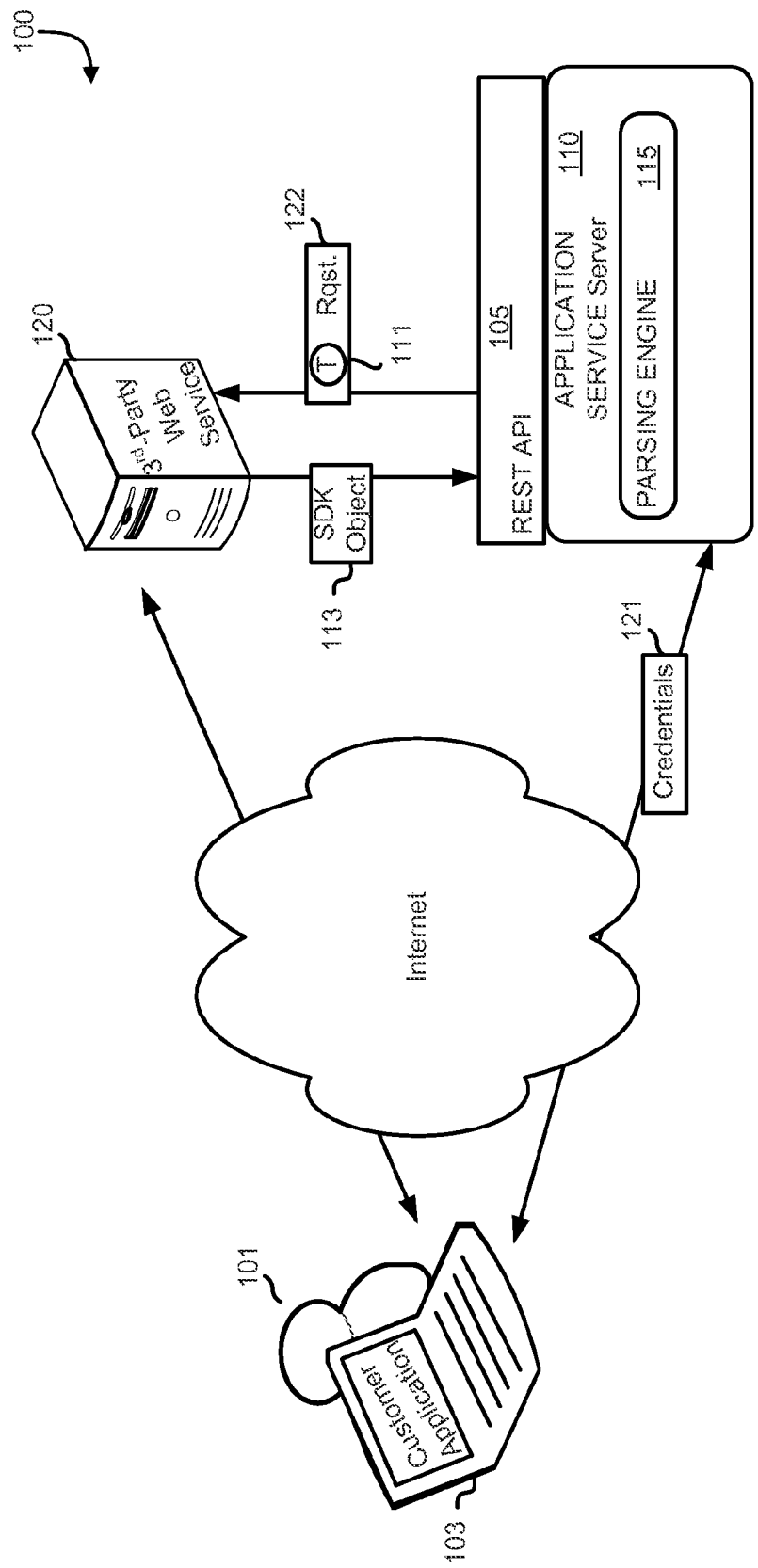
FIG. 1 is an illustrative example of an environment in accordance with at least one embodiment.

FIG. 1 is an example embodiment of an environment 100 for implementing aspects in accordance with various embodiments. As will be appreciated, although an Internet environment 100 is used for purposes of explanation, different environments may be used, as appropriate, to implement various embodiments.

Example embodiments of FIG. 1 include examples of a customer device 103 connected to a third-party web service 120, such as Amazon AWS®, in accordance with at least one embodiment. The web service 120 may provide a variety of services to the customer 101 and the customer device 103 may communicate with the web service 120 via an interface, such as an API, which may be a web services interface or any other type of customer interface. The customer 101 may be an organization or company that utilizes one or more of the services provided by the third-party web service 120, which may be located in various geographical locations.

A parsing engine 115, according to example embodiments, may be configured to retrieve data via a cloud API, such as via a representation state transfer ("REST") API 105. One of the parsing engine's primary function may be to take an instantiated object 113 from a language native SDK and produce the data behind the SDK into a new data structure. The parsing engine 115 does this, in some embodiments, by first taking the instantiated object 113 and then inspecting the object, via a signature engine 117, to determine which methods the object has. The signature engine 117 then searches for methods that match certain type and parity criteria.

The parsing engine 115 is further configured to execute a function call, such as an API call like request 122 that is defined by the REST API 105 such that the parsing engine may request services from the third-party web service 120 for each method of the object. The API call may include hardware related services (e.g., access a hard disk), creating and executing new processes, and/or communicating with integral kernel services. As each method returns data, in response to the call, the parser is configured to inspect the return value(s) of the method for its object type. The parser then decides what to do with the newly produced objects. For example, as the parser receives objects, the parser recursively places the new objects back into parse format, so that the entire object tree is ultimately traversed, scraped, and placed into a new data structure for analysis. A method list may be a sequential list or non-sequential list describing the authentication methods to be queried in order to authenticate a user or determine the security and/or configuration policies of an object, such as a variable, data structure, or function. In some example embodiments, method list enables a customer, or the security platform on behalf of the customer, to designate one or more security protocols to be used for authentication.

A parsing engine using the above method can discover more than just what the API provider publishes. Often, the best information a parser, other program, or operator has about an API from a cloud provider is the information provided by the native object bindings in the SDK. Therefore, the parsing engine can begin with this interface, and use many meta-programming techniques to extract the desired data via this method-traversing mechanism. This data can then be filtered by various post-processing criteria before ultimately being analyzed for vulnerabilities and producing alerts and reports.

Figure 2:
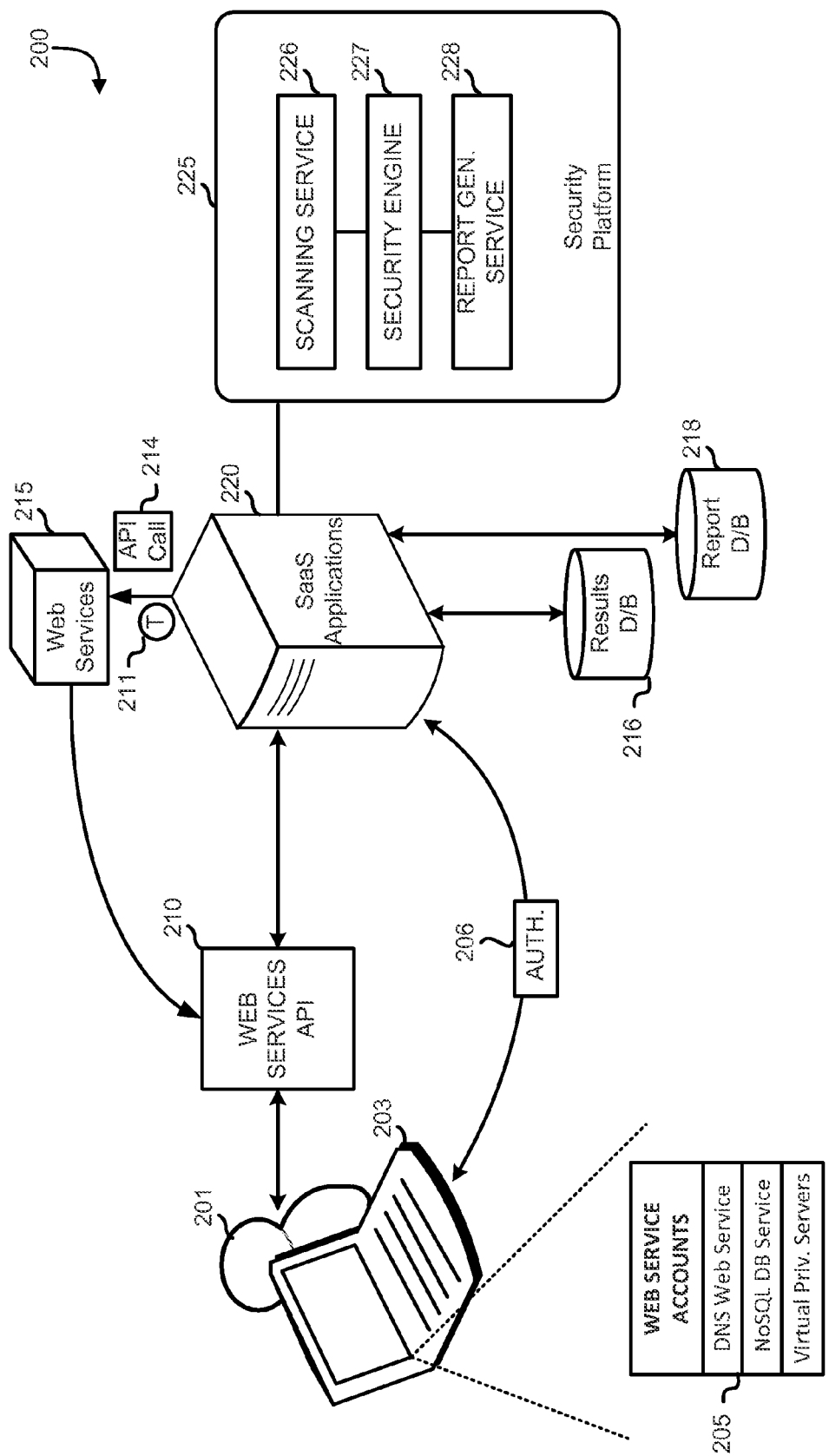
FIG. 2 is an illustrative example of an environment in which various embodiments can be implemented.

FIG. 2 is an illustrative example of an environment showing a communications channel between a customer 201, a Software-as-a-Service ("SaaS") application 220, and a web service 215 in accordance with example embodiments. As described herein, each of the services may include one or more web service interfaces that enable the SaaS application 220 to submit appropriately configured API calls 214, on behalf of the customer 201, to the various services, such as web services 215, which may be associated with one or more web service accounts 205 of the customer, through web service requests.

The customer 201 may provide authentication credentials 206, such as a access key identifier, secret access key, and a session token, to the SaaS application 220, which may contain or be operably interconnected with a security platform 225 and is also operably interconnected with the web service 215 via the web services application programming interface ("API") 210.

The security platform 225 may include or be operably interconnected with a scanning service 226, which may be implemented in a server or may be a hardware apparatus, for example, a computer or computer system, and/or may be implemented as a software application or process running on the computer or computer system. One or more devices, such as client applications running on a computer device 203 may be operably interconnected to one or more servers or clusters via a network or intermediary networks. The one or more devices may connect to the servers via one or more clients, where the clients may be the same or different applications and may similarly communicate with other destination devices coupled to the network or intermediary networks.

The security engine 227 may be configured to run a series of signatures, where each signature characterizes a single type of configuration error. Such signatures are run against the configurations of multiple customers at once, and the vulnerability reports may be collected per-customer and delivered through the web front-ends of a software stack of or related to the security platform. Components of the security platform may implement a series of signatures or fingerprints over the extracted information in order to perform different levels of security analyses on the extracted data.

Signatures may be configured to receive raw data from the web services API scrape and use that information to determine the security risks of a customer's application based on a level of security. For example, the signature engine may analyze the scraped data and determine a risk assessment level, such as fail, pass, warn, error, and the like. In alternative example embodiments, customers may develop custom signatures to be used via the security platform. Such custom signatures may be developed in JavaScript® for use with a component of the security platform backend configured to execute JavaScript® signatures. Both types of signatures, custom signatures and platform signatures, may be configured to use either scraped, cached data or live, endpoint data to the web services API in order to receive the information needed to determine a risk factor.

If the web service authenticates the user, the web service may issue a PASS response to the SaaS application server and the SaaS application is allowed to access the web services on behalf of the customer. If the web services returns a FAIL response, the SaaS application is denied access and the session is terminated. If a web service does not respond, then the SaaS application server processes that as an ERROR and queries for possible authentication information changes back to the customer 201 or requests a different form of authentication. This pattern would continue through the remaining designated methods until the SaaS application server is either authenticated or rejected, or until the session is terminated. A FAIL response is different from an ERROR. A FAIL means that the SaaS application server has not met the criteria contained in the applicable authentication database to be successfully authenticated. Authentication ends with a FAIL response. An ERROR means that the security server has not responded to an authentication query.

The scraped data and the live data may be used interchangeably. For example, if the scraped data needed to perform a specific signature is missing it will automatically use the live API endpoint to retrieve the desired data from web services. For example, the security platform may provide for the detection of routing parameters permitting all network traffic, backups configured and kept up to-date, resources that are created but not referenced or used, encryption enabled on resources that support it, SSL and TLS cipher sets restricted to only secure ciphers, multi-factor authentication enabled, limit to the number of privileged users, publicly available resources being publicly detectable, and hundreds more. Additional metadata related to the web service and its configuration details may be scraped. For example, the metadata related to configurative and/or descriptive data related to the size of a virtual machine being used, the amount of memory in use, the amount of memory available, the operating system being launched, the users that a customer has configured, user account summary details, and the like.

Using a scanning client, an operator (a computer, computer process or person, typically a person) would sign-up and/or login, to begin an authenticated session. The scanning client would then obtain customer cloud keys, and from there the operator could manage alert subscriptions, manage operator details (e.g., email address, contact info, etc.), view an alert history and/or view risk reports. For AWS®, the scanning client's UI enables customers to sign up, login, provide their AWS® key, manage their email address, subscribe to alerts, and view reports and alert history.

The scanning client's UI may be configured to encrypt the read-only IAM access keys that the scanning client obtains from the operator. The UI is further configured to retrieve/receive the customer information and use it, in combination with the signature engine according to some embodiments, to perform a risk analysis of the customer's cloud infrastructure globally via the cloud API. For example, the UI might allow an operator to perform a risk analysis of the operator's AWS® infrastructure globally via the cloud API for AWS®. This is generally more reliable and cost-effective on resources than just doing a Hypertext Transfer Protocol ("HTTP") scrape, which currently is used by transmitting a packet to an identified service, and, based on the information or lack of information received in response to that packet transmission, performing an analysis. The UI may be configured to display security analysis jobs running in the background continuously in real-time, near real-time, or at any provisioned time period, with results presented to the operator in the UI, per client settings. The UI provides the ability for a customer to select the customer's alert method and either receive them via email or in another manner.

It is noted that not all embodiments described above include the services described with reference to FIG. 1 and additional services may be provided in addition to or as an alternative to services explicitly described herein.

FIG. 3 is an illustrative example of a user interface 300 showing a security report according to example embodiments presented herein. The security report may be generated on a user device, such as on a client running on the computer device 103 described and illustrated in connection with FIG. 1. The security report may be the outcome of a traversed and analyzed security platform based on a customer's application running in a third-party web services cloud architecture. The security report may provide for different regions 302 around the World, different services 304 of the web service, different severities 306 of problems located, and a status determination 308 as to whether the customer was to be alerted based on the outcome of a security analysis.

According to example embodiments of the present disclosure, the web services 304 may include, for example, Amazon® AppStream, CloudFront, CloudSearch, CloudWatch, Cognito Identity, Cognito Sync, DevPay, DynamoDB, EC2, Elastic MapReduce, Elastic Transcoder, ElastiCache, Glacier, Kinesis, Mechanical Turk, Mobile Analytics, Redshift, Relational Database Service, Route 53, Simple Email Service, SimpleDB, Simple Notification Service, Simple Queue Service, Simple Storage Service ("S3"), Simple Workflow Service, VPC, Auto Scaling. Additional examples may include AWS® CloudTrail, CloudFormation, Data Pipeline, Direct Connect, Elastic Beanstalk, Identity and Access Management ("IAM"), Import/Export, OpsWorks, Security Token Service ("STS"), Storage Gateway, Support, Elastic Load Balancing, and additional services.

Figure 4:
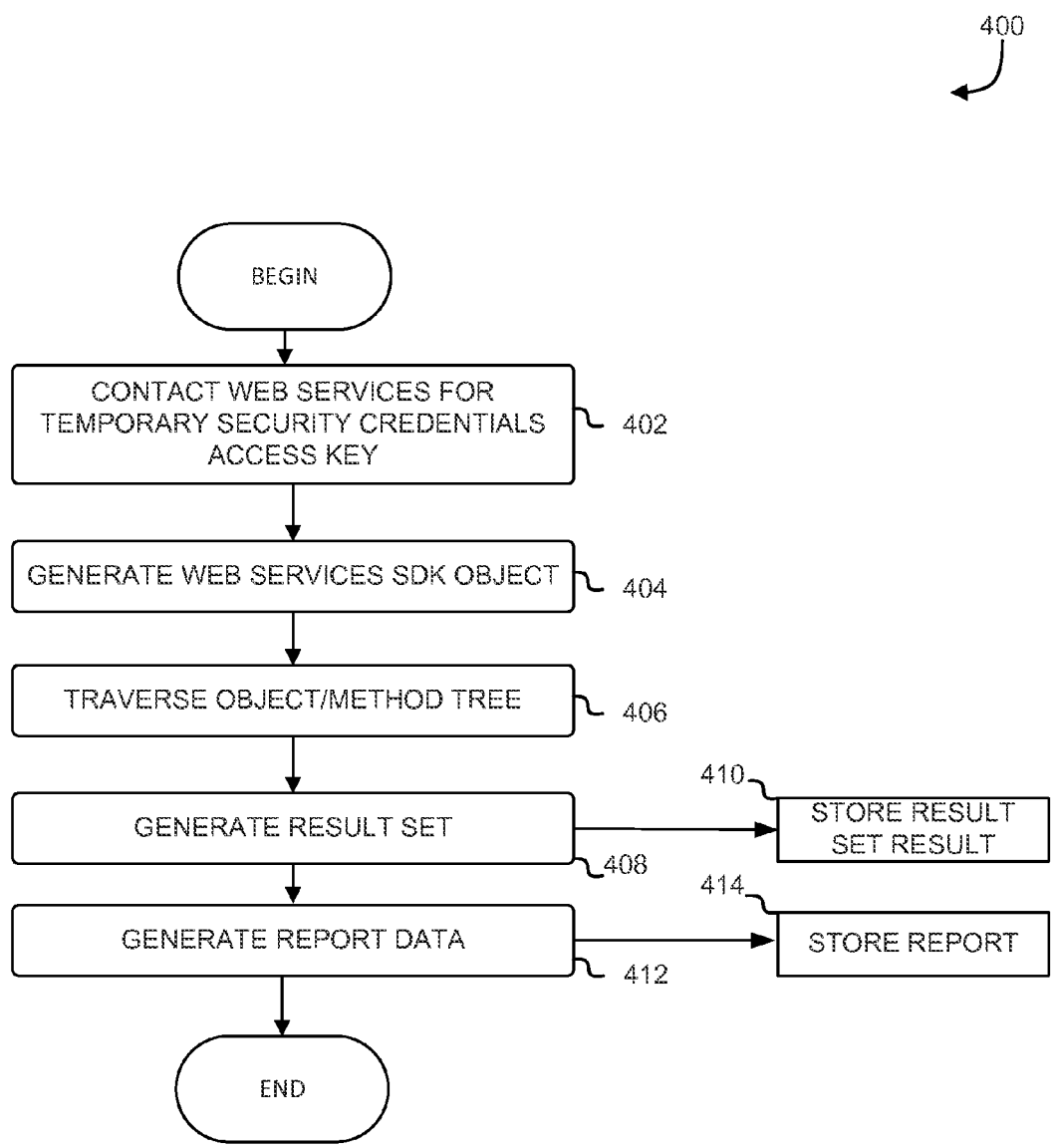
FIG. 4 is an illustrative example of a process for generating data reports from object/method tree traversals in accordance with at least one embodiment.

FIG. 4 is an illustrative example of a process 400 that is a high-level process for traversing a method/object tree in accordance with an example embodiment presented herein. The process 400 may be performed by any suitable system, such as by the SaaS application server 220 as described and illustrated in connection with FIG. 2 and/or any suitable system or component thereof. Returning to FIG. 4, according to the process 400, a scanning service of the security platform transmits a request to a web service, such as AWS®, requesting temporary security credentials to access the remote API on behalf of a customer (402). Assuming that authentication occurs, the scanning service generates a web service software development kit ("SDK") object (404) and traverses the object/method tree from the generated SDK object (406). The scanning service further generates a result set (408) and stores the result set (410). Last, the scanning service generates report data based on the results (412) and stores the report in a database (414).

Figure 5:
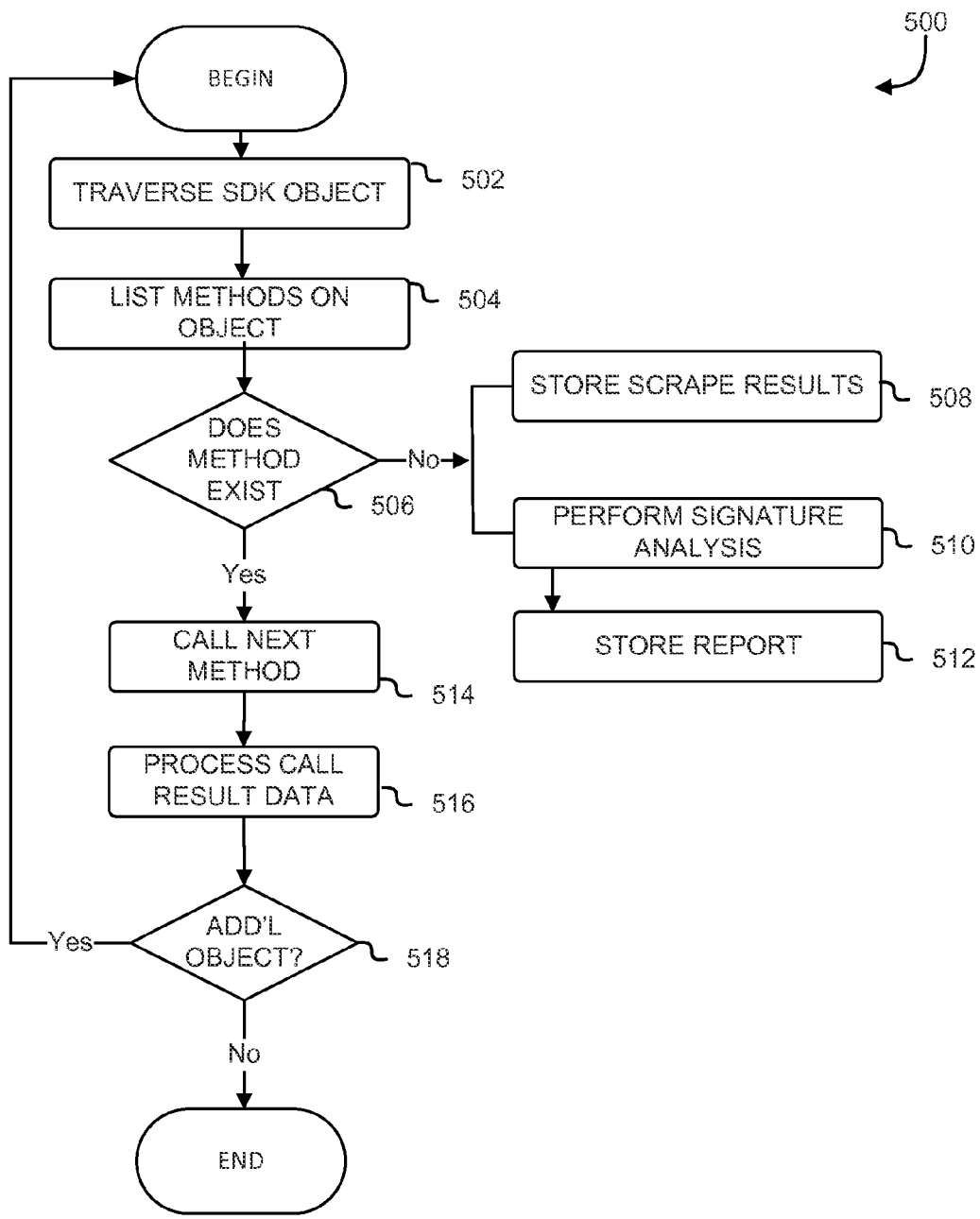
FIG. 5 is an illustrative example of a process for traversing methods of software development kit objects in accordance with at least one embodiment.

FIG. 5 is an illustrative example of a process 500 that may be used to traverse a software development kit object in accordance with an example embodiment presented herein. The process 500 may be performed by any suitable system, such as by the application service server 110 as described and illustrated in connection with FIG. 1 and/or any suitable system or component thereof. Returning to FIG. 5, according to the process 500, a scraping engine may be configured to traverse the software development kit ("SDK") object (502) and receive a list of methods on that object (504). The scraping engine performs recursive scrapes of the methods on the object, such that each time a method is scraped, the received data may be an additional object, when that is the case, the scraping engine determines if another method exists (506). If an additional method is found, an API call to the next method is made (514) and the data resulting from that API call is processed (516). Once the resulting data is processed, the scraping engine determines if there is another object associated with that level of data, if yes, the recursion returns to the beginning; if no, the process ends.

If an addition method is not found, the scraping engine stores the scraped results (508), performs a signature analysis on the scraped data (510), and stores the end security report based on the signature analysis of the scraped data (512).

Figure 6:
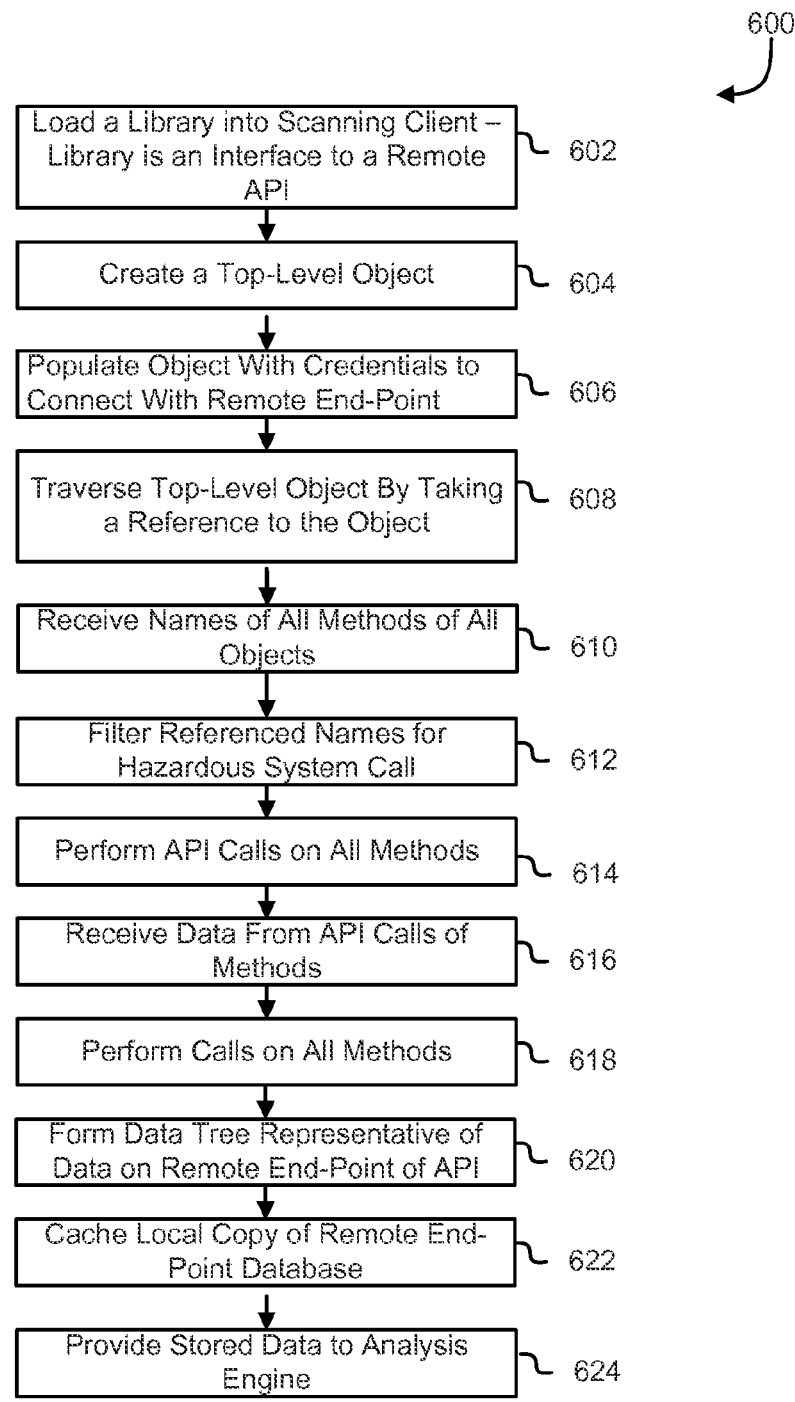
FIG. 6 is an illustrative example of a process for scanning remote end-point API data in accordance with at least one embodiment.

FIG. 6 is an illustrative example of a process 600 that may be used to parse a customer's software development kit object in accordance with an example embodiment presented herein. The process 600 may be performed by any suitable system, such as by the SaaS application server 220 as described and illustrated in connection with FIG. 2 and/or any suitable system or component thereof. Returning to FIG. 6, according to the process 600, a server may be configured to load a library into a scanning client, where the library may be an interface to a remote application programming interface (602). After the library is added, a security platform is configured to create a top-level object (604) and populate the object with credentials to create a communications channel with the remote endpoint (606). The credentials may include access keys that are configured to digitally sign for API calls made to web application services, such as an access key credential comprising of an access key identifier and a secret key. Where the secret key portion must be secured by a web service account customer or a federated user to whom the web services account user has previously assigned. Alternative methods for authentication between the security platform application or server and the web services may similarly apply, such as cross-account access or cross-origin resource sharing, for example.

Returning to FIG. 6, after a communications connection with the remote API is established using the credentials, the server traverses a top-level object by taking a reference of the names of methods associated with the object (608) and receives the names of all methods of all found objects (610). The security platform or a sub-class scraper operably interconnected thereto, filters the referenced method names for hazardous function calls (612), such as ignoring or deleting any calls that may potentially effect or write-over data at the API. The security platform further performs an API call on all of the methods referenced (614) and receives data after each called method (616). The data is received in line with the calls, and each method of all objects found within the top-level object are called and creates a tree of data representative of the data stored on a remote endpoint of the API (618-620). The security platform caches a local copy of the remote endpoint database (622) and provides the stored data to an analysis engine (624) for further processing, signature application, and report generation.

Figure 7:
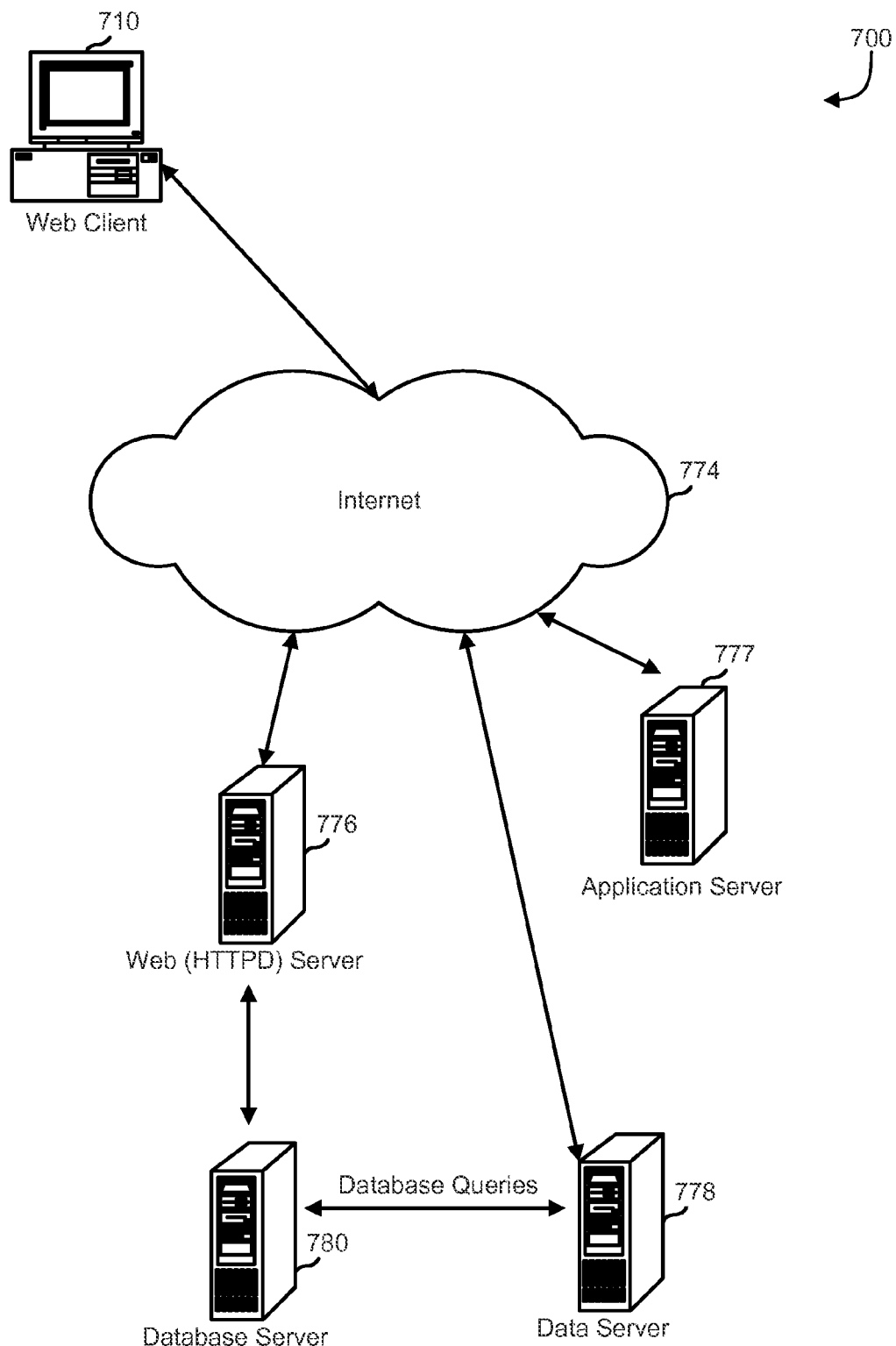
FIG. 7 is an illustrative example of an environment in accordance with at least one embodiment.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device, such as the web client 710, which can include any appropriate device operable to send and/or receive requests, messages, or information over an appropriate network 774 and, in some embodiments, convey information back to a user of the device. Examples of such client devices include personal computers, cell phones, laptop computers, tablet computers, embedded computer systems, electronic book readers, and the like. In this example, the network includes the Internet, as the environment includes a web server 776 for receiving requests and serving content in response thereto and at least one application server 777. It should be understood that there could be several application servers. Servers, as used herein, may be implemented in various ways, such as hardware devices or virtual computer systems. In some contexts, servers may refer to a programming module being executed on a computer system. The example further illustrate a database server 780 in communication with a data server 778, which may include or accept and respond to database queries.

It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory ("RAM"), read only memory ("ROM"), compact disk read only memory ("CD-ROM"), and so forth. In operation, a general purpose or application specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the disclosure.

The foregoing examples illustrate certain example embodiments of the disclosure from which other embodiments, variations, and modifications will be apparent to those skilled in the art. The disclosure should therefore not be limited to the particular embodiments discussed above, but rather is defined by the claims.

While this disclosure has been particularly shown and described with references to example embodiments thereof, it will be understood by those skilled in the art that various changes in form and details may be made therein without departing from the scope of the disclosure encompassed by the appended claims.

Various embodiments of the present disclosure utilize at least one network that may be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a web server, the web server can run any of a variety of server or mid-tier applications, including Hypertext Transfer Protocol ("HTTP") servers, FTP servers, data servers, Java servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Perl, Python or TCL, as well as combinations thereof.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

APPENDIX A

Output related to virtual server deployments in public cloud environment(s)

```
{
  "Reservations": [
    {
      "OwnerId": "613698206329",
      "ReservationId": "r-ee73f9c4",
      "Groups": [ ],
      "RequesterId": "226008221399",
      "Instances": [
        {
          "Monitoring": {
            "State": "enabled"
          },
          "PublicDnsName": "ec2-54-208-198-221.compute-1.cloud.example.com",
          "RootDeviceType": "ebs",
          "State": {
            "Code": 16,
            "Name": "running"
          },
          "EbsOptimized": false,
          "LaunchTime": "2014-09-28T09:45:54.000Z",
          "PublicIpAddress": "54.208.198.221",
          "PrivateIpAddress": "10.100.1.114",
          "ProductCodes": [ ],
          "VpcId": "vpc-181ad07d",
          "StateTransitionReason": null,
          "InstanceId": "i-da68f437",
          "ImageId": "ami-de45f1b6",
          "PrivateDnsName": "ip-10-100-1-114.ec2.internal",
          "KeyName": "devshell",
          "SecurityGroups": [
            {
              "GroupName": "corpweb-092614-EC2SecurityGroup-D2T0WUN7S5TL",
              "GroupId": "sg-d82a1fbd"
            }
          ],
          "ClientToken": "211c70e0-2602-4266-9702-4f0a191902d5_us-east-1b__1",
          "SubnetId": "subnet-9f6269d9",
          "InstanceType": "m3.medium",
          "NetworkInterfaces": [
            {
              "Status": "in-use",
              "SourceDestCheck": true,
              "VpcId": "vpc-181ad07d",
              "Description": null,
              "Association": {
                "PublicIp": "54.208.198.221",
                "PublicDnsName": "ec2-54-208-198-221.compute-1.cloud.example.com",
                "IpOwnerId": "cloudprovider"
              },
```

APPENDIX A-continued

Output related to virtual server deployments in public cloud environment(s)

```
            "NetworkInterfaceId": "eni-64ac573c",
            "PrivateIpAddresses": [
              {
                "PrivateDnsName": "ip-10-100-1-114.ec2.internal",
                "Association": {
                  "PublicIp": "54.208.198.221",
                  "PublicDnsName": "ec2-54-208-198-221.compute-1.cloud.example.com",
                  "IpOwnerId": "cloudprovider"
                },
                "Primary": true,
                "PrivateIpAddress": "10.100.1.114"
              }
            ],
            "PrivateDnsName": "ip-10-100-1-114.ec2.internal",
            "Attachment": {
              "Status": "attached",
              "DeviceIndex": 0,
              "DeleteOnTermination": true,
              "AttachmentId": "eni-attach-5531e733",
              "AttachTime": "2014-09-28T09:45:54.000Z"
            },
            "Groups": [
              {
                "GroupName": "corpweb-092614-EC2SecurityGroup-D2T0WUN7S5TL",
                "GroupId": "sg-d82a1fbd"
              }
            ],
            "SubnetId": "subnet-9f6269d9",
            "OwnerId": "613698206329",
            "PrivateIpAddress": "10.100.1.114"
          }
        ],
        "SourceDestCheck": true,
        "Placement": {
          "Tenancy": "default",
          "GroupName": null,
          "AvailabilityZone": "us-east-1b"
        },
        "Hypervisor": "xen",
        "BlockDeviceMappings": [
          {
            "DeviceName": "/dev/sda1",
            "Ebs": {
              "Status": "attached",
              "DeleteOnTermination": true,
              "VolumeId": "vol-46dedf03",
              "AttachTime": "2014-09-28T09:45:58.000Z"
            }
          }
        ],
        "Architecture": "x86_64",
        "KernelId": "aki-919dcaf8",
        "IamInstanceProfile": {
          "Id": "AIPAJEKMMO3DADC7XWORA",
          "Arn": "arn:aws:iam::613698206329:instance-profile/InstanceCorpWebRole"
        },
        "RootDeviceName": "/dev/sda1",
        "VirtualizationType": "paravirtual",
        "Tags": [
          {
            "Value": "CorpWebAutoScalingGroup",
            "Key": "aws:cloudformation:logical-id"
          },
          {
            "Value": "corpweb-092614",
            "Key": "Name"
          },
          {
            "Value": "corpweb-092614",
            "Key": "aws:cloudformation:stack-name"
          },
          {
            "Value": "arn:aws:cloudformation:us-east-1:613698206329:stack/corpweb-092614/13253180-45d6-11e4-b2d0-50e2416294a8",
            "Key": "aws:cloudformation:stack-id"
          },
```

APPENDIX A-continued

Output related to virtual server deployments in public cloud environment(s)

```
            {
              "Value": "corpweb-092614-CorpWebAutoScalingGroup-14SI2S6VXFUDE",
              "Key": "aws:autoscaling:groupName"
            }
          ],
          "AmiLaunchIndex": 0
        }
      ]
    },
```

APPENDIX B

Signature to post-process scrape result and enumerate security mechanisms for strength and correctness.

```
# Encoding: utf-8
module DSL
  class Signatures
    class SecurityGroupInstanceMap < DSL::InternalDSL
      def initialize
        configure do |c|
          c.module         = 'security_group_instance_map'
          c.description    = 'Check for flaws in security groups as mapped to EC2 instances'
          c.identifier     = 'AWS:EC2-033'
          c.usage          = 'metascrape.signatures.security_group_instance_map.perform metascrape.customers.evident.aws.us_east_1'
          c.tags           = [:ec2, :signature]
          c.deep_inspection = [:security_group_name, :protocol, :port, :instance_id]
          c.unique_identifier =[:security_group_name, :protocol, :port, :instance_id]
        end
        @ports = [[22, :tcp], [23, :tcp], [3389, :tcp], [135, :tcp], [445, :tcp], [3306, :tcp], [5432, :tcp], [1433, :tcp], [1434, :udp], [4333, :tcp], [5500, :tcp], [5900, :tcp], [137, :udp], [138, :udp], [445, :udp], [21, :tcp], [20, :tcp], [25, :tcp], [53, :udp], [53, :tcp]]
        @ranges = ['0.0.0.0/0']
      end
      def perform(aws)
        alerts = [ ]
        used_by = { }
        ### Store off a hash of all active security groups
        security_groups = aws.ec2.describe_security_groups
        if security_groups.respond_to?('security_groups') && security_groups.security_groups.is_a?(Array)
          security_groups.security_groups.each do |security_group|
            used_by[security_group.group_name] = Array.new
          end
        end
        ### Iterate through each EC2 instance and store which security_groups each uses
        ec2_instances = aws.ec2.describe_instances
        if ec2_instances.respond_to?('reservations') && ec2_instances.reservations.is_a?(Array)
          ec2_instances.reservations.each do |reservation|
            if reservation.respond_to?('instances') && reservation.instances.is_a?(Array)
              reservation.instances.each do |instance|
                if instance.respond_to?('security_groups') && instance.security_groups.is_a?(Array)
                  instance.security_groups.each do |security_group|
                    used_by[security_group.group_name] ||= [ ]
                    used_by[security_group.group_name].push(instance.instance_id)
                  end
                end
              end
            end
          end
        end
        ### Examine security groups for problematic open ports
        if security_groups.respond_to?('security_groups') && security_groups.security_groups.is_a?(Array)
          security_groups.security_groups.each do |security_group|
            if security_group.respond_to?('ip_permissions') &&
```

APPENDIX B-continued

Signature to post-process scrape result and enumerate
security mechanisms for strength and correctness.

```
security_group.ip_permissions.is_a?(Array)
      security_group.ip_permissions.each do |ip_permission|
        @ports.each do |port|
          if port[0] == ip_permission.to_port && port[1].to_s == ip_permission.ip_protocol
          ip_permission.ip_ranges.each do |ip_range|
            @ranges.each do |r|
             if ip_range.cidr_ip == r
              result = {
                ip_permission: ip_permission,
                port: port,
                ip_range: ip_range.cidr_ip,
                range: r,
                security_group: security_group.group_name
              }
              if used_by[security_group.group_name].length == 0
               result[:message] = "Security Group #{security_group.group_name} has #{ip_permission.ip_protocol} port #{ip_permission.to_port} exposed globally. No instances impacted."
               report = {
                 security_group_name: security_group.group_name,
                 protocol: ip_permission.ip_protocol,
                 port: ip_permission.to_port
               }
               set_data(report)
               alerts.push fail(result)
              else
               used_by[security_group.group_name].each do |instance_id|
                 result[:instance_id] = instance_id
                 result[:message] = "Instance #{instance_id} has #{ip_permission.ip_protocol} port #{ip_permission.to_port} exposed globally by Security Group #{security_group.group_name}."
                 report = {
                   security_group_name: security_group.group_name,
                   protocol: ip_permission.ip_protocol,
                   port: ip_permission.to_port,
                   instance_id: instance_id
                 }
                 set_data(report)
                 alerts.push fail(result)
               end
             end
            end
          end
         end
        end
       end
      end
     end
    end
   alerts
  end
 end
end
end
```

What is claimed is:

1. A computer-implemented method for parsing software development kit interfaces to obtain customer usage, comprising:

under the control of one or more computer systems configured with executable instructions, loading a library to a security platform, wherein the library is an interface to a remote application programming interface ("API");

generating a top-level object of the API;

executing initial function calls against the interface to retrieve reference names of methods for the top-level object, wherein a reference name of a retrieved method is a name useable for specifying a future call to a particular function;

recursively executing subsequent function calls against the interface using the reference names;

recursively retrieving data from methods of the executed subsequent function calls using previously retrieved reference names; and storing retrieved data in a data store.

2. The computer-implemented method of claim 1, wherein the recursively executing is performed until a predetermined object is retrieved.

3. The computer-implemented method of claim 1, further comprising:

detecting a last object based on the top-level object; and completing the recursive retrieving based at least in part on the detected last object.

4. The computer-implemented method of claim 1, wherein the remote application programming interface is an application programming interface for a cloud infrastructure service.

5. The computer-implemented method of claim 1, wherein the top-level object includes access credentials configured to connect with a remote endpoint and wherein the access credentials are used in executing the initial function calls against the interface and the subsequent function calls against the interface.

6. The computer-implemented method of claim 1, further comprising recursively retrieving data from method of the initial function calls.

7. A system, comprising at least one computing device configured to implement one or more services, wherein the one or more services are configured to:
   load a library, wherein the library is an interface to a remote application programming interface ("API");
   generate a top-level object;
   execute at least one call against the interface to retrieve names of methods for the top-level object, wherein a retrieved name of a retrieved method is useable for specifying a future call to a particular function;
   filter the retrieved names of the methods, wherein the filtering includes removing the retrieved names of the methods when the call may be unsafe;
   execute each method of the retrieved methods using the retrieved names of the retrieved methods, wherein executing each method returns a set of data related to each method; and
   store the set of data in a data store.

8. The system of claim 7, wherein an unsafe call may include a call that, if executed, would change, alter, modify, or delete data related to an object associated with the call.

9. The system of claim 7, wherein each method is executed in an order, the order including executing a first method, retrieving data associated with the executed first method, and executing a second method.

10. The system of claim 7, wherein the set of data comprises a representation of data stored on a remote endpoint of the application programming interface.

11. The system of claim 7, wherein the one or more services are further configured to retrieve metadata related to the top-level object and at least one additional object.

12. The system of claim 7, wherein the remote application programming interface is an application programming interface for a cloud infrastructure service.

13. The system of claim 7, wherein the one or more services are further configured to perform a security risk assessment based at least in part on the set of data.

14. The system of claim 7, wherein the top-level object includes access keys associated with a customer of the remote API, wherein the access keys are configured to authenticate a communication channel with a remote endpoint.

15. The system of claim 14, wherein the access keys associated with the customer of the remote application programming interface include a temporary security credential, the temporary security credential including an access key identifier, a secret access key, and a session token.

16. A non-transitory computer-readable storage medium having stored thereon executable instructions that, when executed by one or more processors of a computer system, cause the computer system to at least:
   load a library, wherein the library is an interface to a remote application programming interface ("API");
   create a first object execute an initial call to retrieve names of methods for the first object;
   execute each method of the retrieved methods, wherein executing each method returns a set of data related to each method, wherein a retrieved name of a retrieved method is useable for specifying a future call to a particular function;
   receive multiple objects in response to executing each method;
   retrieve data associated with each of the multiple objects, wherein retrieving the data associated with each of the multiple objects includes recursively executing a subsequent call for each method in the multiple objects using the retrieved names of the retrieved methods; and
   store the retrieved data.

17. The non-transitory computer-readable storage medium of claim 16, wherein the instructions further comprise instructions that, when executed by the one or more processors, cause the computer system to continuously monitor the remote application programming interface in real-time or near real-time.

18. The non-transitory computer-readable storage medium of claim 16, wherein the instructions further comprise instructions that, when executed by the one or more processors, cause the computer system to scan security and/or configuration setting permutations for each object.

19. The non-transitory computer-readable storage medium of claim 16, wherein the instructions further comprise instructions that, when executed by the one or more processors, cause the computer system to provide a graphical user interface output to display the retrieved data associated with the first object and the multiple objects.

20. The non-transitory computer-readable storage medium of claim 16, wherein the instructions further comprise instructions that, when executed by the one or more processors, cause the computer system to apply a signature to the retrieved data.

21. The non-transitory computer-readable storage medium of claim 20, wherein the instructions that cause the computer system to apply the signature to the retrieved data further include instructions that cause the computer system to provide an alert based at least in part on an outcome of the signature.

22. The non-transitory computer-readable storage medium of claim 16, wherein the instructions further comprise instructions that, when executed by the one or more processors, cause the computer system to interpret the retrieved data according to a security rules analysis.

23. The non-transitory computer-readable storage medium of claim 16, having stored thereon further executable instructions to process the first object including authentication credentials associated with a customer of the remote API, wherein the authentication credentials are configured to authenticate a communication channel with the remote API.

* * * * *